United States Patent
Fervel et al.

(10) Patent No.: US 9,081,372 B2
(45) Date of Patent: Jul. 14, 2015

(54) DISTRIBUTED FLIGHT CONTROL SYSTEM IMPLEMENTED ACCORDING TO AN INTEGRATED MODULAR AVIONICS ARCHITECTURE

(75) Inventors: Marc Fervel, Toulouse (FR); Arnaud Lecanu, Blagnac (FR); Antoine Maussion, Toulouse (FR); Jean-Jacques Aubert, Pibrac (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 131 days.

(21) Appl. No.: 13/255,778

(22) PCT Filed: Mar. 10, 2010

(86) PCT No.: PCT/FR2010/050405
§ 371 (c)(1),
(2), (4) Date: Dec. 20, 2011

(87) PCT Pub. No.: WO2010/103233
PCT Pub. Date: Sep. 16, 2010

(65) Prior Publication Data
US 2012/0101663 A1    Apr. 26, 2012

(30) Foreign Application Priority Data

Mar. 11, 2009    (FR) ..................... 09 51527

(51) Int. Cl.
*G01C 21/00*    (2006.01)
*G01C 23/00*    (2006.01)
(Continued)

(52) U.S. Cl.
CPC . *G05B 9/03* (2013.01); *B64C 13/42* (2013.01); *B64C 13/503* (2013.01)

(58) Field of Classification Search
CPC ........ G01R 31/08; G06F 11/00; G08C 15/00; H04J 1/16; H04J 3/14; B64C 13/50; G05D 1/77; G01C 21/00; G01C 23/00
USPC ........................................ 701/3, 33
See application file for complete search history.

(56) References Cited

U.S. PATENT DOCUMENTS 4,754,940 A * 7/1988 Deter ........................... 244/75.1
4,887,214 A * 12/1989 Takats et al. ..................... 701/3

(Continued)

FOREIGN PATENT DOCUMENTS

EP      1 353 247 A      10/2003
FR   WO 2007147990   * 12/2007 ................... 370/255

OTHER PUBLICATIONS

Andrade, L. and Tenning, C., "Desing of Boeing 777 Electic System," IEEE National Aerospace and Electronics Conference, pp. 1281-1290, May 18-22, 1992.*

(Continued)

*Primary Examiner* — Yonel Beaulieu
(74) *Attorney, Agent, or Firm* — Oblon, McClelland, Maier & Neustadt, L.L.P.

(57) ABSTRACT

A flight control system for an aircraft, intended for controlling a plurality of actuators adapted for actuating control surfaces of the aircraft from information supplied by piloting members and/or sensors of the aircraft. The system includes a primary control system adapted for controlling a first set of control surface actuators and a secondary control system adapted for controlling a second set of control surface actuators, the primary and secondary systems being respectively powered by independent energy sources of different types.

20 Claims, 5 Drawing Sheets

(51) Int. Cl.
*G05B 9/03* (2006.01)
*B64C 13/42* (2006.01)
*B64C 13/50* (2006.01)

(56) References Cited

U.S. PATENT DOCUMENTS

| | | | |
|---|---|---|---|
| 4,916,612 A * | 4/1990 | Chin et al. | 701/3 |
| 5,074,495 A * | 12/1991 | Raymond | 244/78.1 |
| 5,550,736 A * | 8/1996 | Hay et al. | 701/3 |
| 5,806,805 A * | 9/1998 | Elbert et al. | 244/195 |
| 5,809,220 A * | 9/1998 | Morrison et al. | 714/12 |
| 6,047,391 A * | 4/2000 | Younis et al. | 714/47.1 |
| 6,112,141 A * | 8/2000 | Briffe et al. | 701/14 |
| 6,443,399 B1 * | 9/2002 | Yount et al. | 244/196 |
| 6,550,018 B1 | 4/2003 | Abonamah et al. | |
| 6,636,786 B2 * | 10/2003 | Partel | 701/3 |
| 6,651,930 B1 * | 11/2003 | Gautier et al. | 244/78.1 |
| 6,664,656 B2 * | 12/2003 | Bernier | 307/9.1 |
| 6,704,624 B2 * | 3/2004 | Ortega et al. | 701/3 |
| 6,856,045 B1 * | 2/2005 | Beneditz et al. | 307/43 |
| 7,159,817 B2 * | 1/2007 | VanderMey et al. | 244/12.1 |
| 7,269,762 B2 * | 9/2007 | Heckmann et al. | 714/47.1 |
| 7,393,248 B2 * | 7/2008 | Best et al. | 439/638 |
| 7,505,400 B2 * | 3/2009 | Bibby et al. | 370/217 |
| 7,556,224 B2 * | 7/2009 | Johnson et al. | 244/175 |
| 7,675,919 B2 * | 3/2010 | Vestal | 370/395.4 |
| 7,787,486 B2 * | 8/2010 | Vestal | 370/442 |
| 7,788,673 B2 * | 8/2010 | Bibby | 718/107 |
| 7,940,195 B2 * | 5/2011 | Fabas et al. | 340/945 |
| 7,946,528 B2 * | 5/2011 | Yoeli | 244/76 R |
| 7,983,195 B2 * | 7/2011 | Andreoletti et al. | 370/255 |
| 7,984,878 B2 * | 7/2011 | Hirvonen | 244/194 |
| 8,036,805 B2 * | 10/2011 | Mahoney et al. | 701/100 |
| 8,104,720 B2 * | 1/2012 | Hirvonen et al. | 244/194 |
| 8,130,773 B2 * | 3/2012 | Hall et al. | 370/401 |
| 8,135,807 B2 * | 3/2012 | Jackson | 709/220 |
| 8,235,328 B2 * | 8/2012 | Hirvonen | 244/194 |
| 8,380,364 B2 * | 2/2013 | Ciholas et al. | 701/3 |
| 8,386,093 B2 * | 2/2013 | Lin et al. | 701/3 |
| 8,396,612 B2 * | 3/2013 | Fernandez-Ramos | 701/3 |
| 8,401,716 B2 * | 3/2013 | Ciholas et al. | 701/3 |
| 8,434,301 B2 * | 5/2013 | Fukui | 60/405 |
| 8,442,702 B2 * | 5/2013 | Geiter | 701/3 |
| 2002/0161488 A1 | 10/2002 | Guillemin et al. | |
| 2003/0195673 A1 | 10/2003 | Foch et al. | |
| 2006/0100750 A1 * | 5/2006 | Platzer et al. | 701/3 |
| 2007/0239325 A1 * | 10/2007 | Regunath | 701/3 |
| 2008/0209195 A1 * | 8/2008 | Gobbo et al. | 713/1 |
| 2009/0031198 A1 * | 1/2009 | Johansson | 714/799 |
| 2009/0189786 A1 * | 7/2009 | Fabas et al. | 340/963 |
| 2009/0193229 A1 * | 7/2009 | Aegerter et al. | 712/30 |
| 2010/0100260 A1 * | 4/2010 | McIntyre et al. | 701/6 |
| 2010/0145555 A1 * | 6/2010 | Hagerott et al. | 701/3 |
| 2010/0170983 A1 | 7/2010 | Fervel et al. | |
| 2010/0170999 A1 | 7/2010 | Fervel et al. | |
| 2010/0231042 A1 * | 9/2010 | Weale | 307/38 |
| 2010/0292870 A1 * | 11/2010 | Saint Marc et al. | 701/3 |
| 2011/0108673 A1 * | 5/2011 | Antraygue | 244/228 |
| 2011/0118906 A1 * | 5/2011 | Fervel et al. | 701/3 |
| 2011/0174921 A1 | 7/2011 | Fervel et al. | |
| 2011/0219267 A1 * | 9/2011 | Migliasso et al. | 714/37 |
| 2011/0251739 A1 * | 10/2011 | Tomas et al. | 701/3 |
| 2011/0270806 A1 * | 11/2011 | Weiler et al. | 707/690 |
| 2011/0276199 A1 * | 11/2011 | Brot | 701/3 |
| 2012/0030519 A1 * | 2/2012 | Wilt et al. | 714/43 |
| 2012/0065521 A1 * | 3/2012 | Boucher et al. | 702/123 |
| 2012/0233359 A1 * | 9/2012 | Einig et al. | 710/16 |
| 2012/0233495 A1 * | 9/2012 | Einig et al. | 714/4.5 |
| 2012/0290153 A1 * | 11/2012 | Olsoe et al. | 701/3 |
| 2013/0138271 A1 * | 5/2013 | Danielsson et al. | 701/3 |

OTHER PUBLICATIONS

Ladd, G.O., "Practical Issues in Heterogeneous Processing Systems for Military Applications," Heterogeneous Computing Workshop, HCW '97 Proceedings, Sixth, pp. 162-169, Apr. 1, 1997.*
Ding Lina et al., "The Research of AFDX System Simulation Model," Multimedia Technology (ICMT), 2010 International Conference, pp. 1-4, Oct. 29-31, 2010.*
Yeh, Y.C., "Triple-triple Redundant 777 Primary Flight Computer," Aerospace Applications Conference, 1996. Proceedings., 1996 IEEE, vol. 1, pp. 293-307, Feb. 3-10, 1996.*
Schuster, et al., "Networking Concepts Comparison for Avionics Architecture," Digital Avionics Systems Conference, IEEE/AIAA 27th, St. Paul, MN Oct. 26-30, 2008.*
Charara et al., "Modeling and Simulation of an Avionics Full Duplex Switched Ethernet," Procd. Adv Indus. Conf. on Telecommunications, IEEE, 2005.*
Moir and Seabridge, Aircraft Systems, 3rd Edition, John Wiley & Sons, 2008, pp. 214-233.*
Moog Aircraft Group and Hispano-Suiza Safran Group, "Electric Actuation for Flight & Engine Control" SAE-ACGSC Mtg 99, Boulder, Mar. 2, 2007.*
Actel "Developing AFDX Solutions", May 29, 2008, http://www.actel.com/documents/AFDX_Solutions_AN.pdf.*
Mark Hanlon "The 800mph Gulfstram G650" Aircraft, Mar. 2008.*
U.S. Appl. No. 13/255,406, filed Sep. 8, 2011, Fervel et al.
International Search Report issued on Jul. 12, 2010 in Patent Application No. PCT/FR2010/050405.

* cited by examiner

DISTRIBUTED FLIGHT CONTROL SYSTEM IMPLEMENTED ACCORDING TO AN INTEGRATED MODULAR AVIONICS ARCHITECTURE

TECHNICAL FIELD

The present invention generally relates to flight control systems in the aeronautics field.

BACKGROUND OF THE INVENTION

The flight control system of an aircraft connects the piloting members (control column, rudder bar, etc.) and the aerodynamic tip-control surfaces. Modern jetliners have electric flight control systems in which the mechanical actions on the piloting members are converted into analog signals that are sent to actuators maneuvering the control surfaces.

FIG. 1 illustrates a centralized flight control system 100, known from the state of the art. We have shown a piloting member 110, for example a side-stick controller, equipped with one or more sensors 115, for example position sensors and/or angular sensors providing position and/or orientation information to the flight control computer 120. The computer 120 determines, from information received from the various piloting members 110, including the auto-pilot (not shown) and/or, if applicable, airplane sensors 150 (accelerometer, rate gyro, inertial unit), the flight controls to be applied to the actuators 130. These actuators are typically hydraulic cylinders controlled by solenoid valves or electric motors acting on the aerodynamic flight-control surfaces of the aircraft 140. The actuators 130 on the one hand, and the aerodynamic flight-control surfaces 140 on the other hand, are equipped with sensors respectively denoted 135 and 145. These sensors inform the computer 120 on the positions and/or orientations of the mobile elements of the actuators as well as those of the control surfaces. For example, one sensor 135 could indicate the translational position of a cylinder, one sensor 145 the orientation of a flap.

The computer 120 has both a command function and a monitoring function. It is connected to the actuators by first cables 133 intended to transmit the analog control signals. It is also connected to the sensors 135 and 145 respectively equipping the actuators and the control surfaces themselves by second cables 137 and third cables 147. It can thus, at any time, monitor the status of the actuators and verify that the commands have been carried out correctly.

In reality, a flight control system is made up of several independent elementary systems, each having its own computers, its own set of sensors and actuators, and its own network of cables.

This flight control system has a certain number of drawbacks, including the need to deploy a large number of cables between the computers on the one hand and the actuators and control surfaces they control on the other. This cable deployment strains the aircraft's weight budget and increases the exposure to risks of electromagnetic disturbances.

In order to resolve these drawbacks, it was proposed in French application no. 08 50806, filed in the Applicant's name and not published, to use a distributed flight control system (DFCS) organized around a multiplexed communication bus. In this DFCS, certain control and monitoring functions are taken off-board the central computers towards remote terminals situated at actuators. The command and monitoring messages between the central computers and remote terminals are sent on said multiplexed bus.

Furthermore, in order to guarantee a high level of safety, each elementary system of the flight control system is powered by a separate energy source.

FIG. 2 illustrates the overall structure of a flight control system of an Airbus A380. The flight control system comprises four independent elementary systems respectively designated SYST1, SYST2, SYST3 and BCM. System SYST1 comprises a primary computer denoted PRIM1 and a second computer denoted SEC1. Likewise, systems SYST2 and SYST3 each comprise a primary computer (PRIM2, PRIM3) and a secondary computer (SEC2, SEC3). The control system BCM is a back-up system.

The computers PRIM1, PRIM2, PRIM3, SEC1, SEC2, SEC3 and BCM are specific computers for the computations of the flight controls. The primary computers PRIM1, PRIM2 and PRIM3 all have the same structure. On the other hand, the secondary computers SEC1, SEC2 and SEC3 have a structure distinct from that of the primary computers.

The flight control system can operate in several modes. The primary computers allow the flight control system to operate in nominal mode 210, i.e. to control all of the control surfaces of the aircraft. The secondary computers operate in standby mode or slave mode of a master primary computer. By default, the master computer is the primary computer PRIM1. It sends the flight commands to all of the other primary computers as well as to the secondary computers.

In the event of failure of computer PRIM1, computer PRIM2 takes over, and if the latter is defective, PRIM3 takes over in turn. When all of the primary computers are defective, the secondary computers take over in the same order SEC1, SEC2, SEC3. In mode 220, the secondary computers implement laws of deteriorated operation, i.e. more robust than those used by the primary systems. Moreover, the secondary computers do not make it possible to perform the auto-pilot function of the airplane, unlike the primary systems. Lastly, the secondary computers control some of the control surfaces of the aircraft from instructions from computer PRIM1 or, failing that, from those of another primary computer, if the latter is defective.

The BCM (Back-up Control Module) computer corresponds to a basic operation 230.

Systems SYST1 and SYST3 are powered by a first electrical energy source, E1, for example a variable frequency voltage generator (VFG). System SYST2 is powered by a second electrical energy source E2, which is independent of the first but of the same type. Lastly, control system BCM is powered by a back-up power supply (BPS), formed by a generator mounted on a hydraulic circuit whereof the fluid is driven by pumps which themselves are mechanically driven by the reactors.

A first object of the present invention is to propose a distributed flight control system having an integrated modular architecture simpler than that of the prior art while guaranteeing a high level of safety. A second object of the present invention is to reduce the number of computers in the flight control system without sacrificing the requisite level of safety.

BRIEF DESCRIPTION OF THE INVENTION

The present invention is defined by a flight control system for an aircraft, intended for controlling a plurality of actuators adapted for actuating the control surfaces of said aircraft from information supplied by the piloting members and/or sensors of the aircraft. The flight control system includes:
  a so-called primary control system adapted for controlling a first set of control surface actuators of said aircraft, comprising at least one computer, called primary computer, each primary computer being made in the form of generic computation modules and powered by an energy source, called primary energy source;

a secondary control system, adapted for controlling a second set of control surface actuators of said aircraft, said secondary system comprising at least one computer, called secondary computer, each secondary computer being made in the form of computation modules having an architecture specific to flight control computations, called specific modules, and being powered by an energy source, called secondary energy source, the primary and secondary energy sources being independent and of different types.

According to one embodiment, the primary control system comprises two primary computers respectively powered by first and second primary energy sources, the first and second energy sources being independent.

Each primary computer is advantageously connected to a network, called primary network, a first plurality of terminals subscribing to said primary network being adapted to acquire signals provided by a first set of sensors, a second plurality of terminals subscribing to said network being able to receive commands from the primary computer and to transmit electric orders to actuators belonging to the first set of actuators.

Each primary network comprises at least one network node, the node of the primary network associated with the first primary computer and the node of the primary network associated with the second primary computer advantageously being connected by a link.

According to one alternative embodiment, at least one cluster of terminals subscribed to the primary network is connected to a micro-switch, said micro-switch being able to receive, on a first port, frames sent by the primary computer intended for at least one terminal of said cluster and, on a plurality of second ports, frames respectively sent by the different terminals of said cluster, said micro-switch having a repeater function on the downlink and a multiplexer function on the uplink.

Each primary computer can be connected to a concentrator via its associated primary network, the concentrator being able to receive information provided by a plurality of said piloting members, to multiplex said information and to send the information thus multiplexed to said primary computer.

Advantageously, at least one primary computer comprises at least one pair of generic modules, said pair of generic modules being formed by a control module and a monitoring module.

According to a first variant of the primary computer, the latter comprises first and second pairs of generic modules, the second pair taking over the control computations if the first pair of generic modules fails.

According to a second alternative embodiment of the primary computer, the latter comprises a triplet of independent generic modules, each module performing the same control computations in parallel from information provided by the piloting members and/or the sensors, the control values obtained by the three modules being compared to select the values given by the majority.

According to a third alternative embodiment of the primary computer, the latter comprises a pair of generic modules formed by a control module and a monitoring module as well as an additional module in reserve that can be configured as a control module or a monitoring module in the case of failure of one or the other of the modules of said pair.

Like the primary computer, the secondary computer can comprise a pair of specific modules, the pair of specific modules being formed by a control module and a monitoring module.

The secondary control system can also comprise a specific reserve module that can be configured as a control module or a monitoring module in the event of a failure of a module belonging to the pair of specific modules.

According to a variant of the secondary computer, the latter comprises a triplet of independent specific modules, each module performing the same control computations in parallel from information provided by the piloting members, the control values obtained by the three modules being compared to select the values given by the majority.

The secondary control system can further comprise a network, called secondary network, each secondary computer being connected to said network, a first plurality of terminals connected to the secondary network being able to acquire signals provided by a second set of sensors and a second plurality of terminals subscribed to said secondary network being able to receive commands from the secondary computer and to transmit electric orders to actuators belonging to the second set of control surface actuators, the first and second sets of sensors being disjoint and the first and second sets of control surface actuators being disjoint.

The secondary control systems can also comprise an independent specific control module, called back-up module, that cannot be deactivated upon outside intervention and cannot deactivate itself, the pair(s) of specific modules as well as the back-up module sharing said second secondary network.

The invention lastly relates to an aircraft comprising a flight control system as described above.

BRIEF DESCRIPTION OF THE DRAWINGS

Other features and advantages of the invention will appear upon reading one preferred embodiment of the invention done in reference to the attached figures, in which.

DETAILED DESCRIPTION OF THE INVENTION

The idea at the basis of the invention is to use at least one primary control system made using generic computers, powered by at least one energy source, called primary energy source, as well as a secondary control system, made in the form of specific computers and powered by an independent energy source, called secondary energy source, of a different type from the primary energy source. Specific computer refers to a computer having a material architecture specific to the flight commands, i.e. more specifically a material architecture adapted to computations of the flight commands as well as the related inputs-outputs. The inputs-outputs in particular allow the acquisition of the signals provided by the onboard sensors and the transmission of said flight commands to the control surface actuators. The secondary system can comprise, aside from the specific secondary computers, a back-up computer, also specific, that will be described later.

Figure 1:
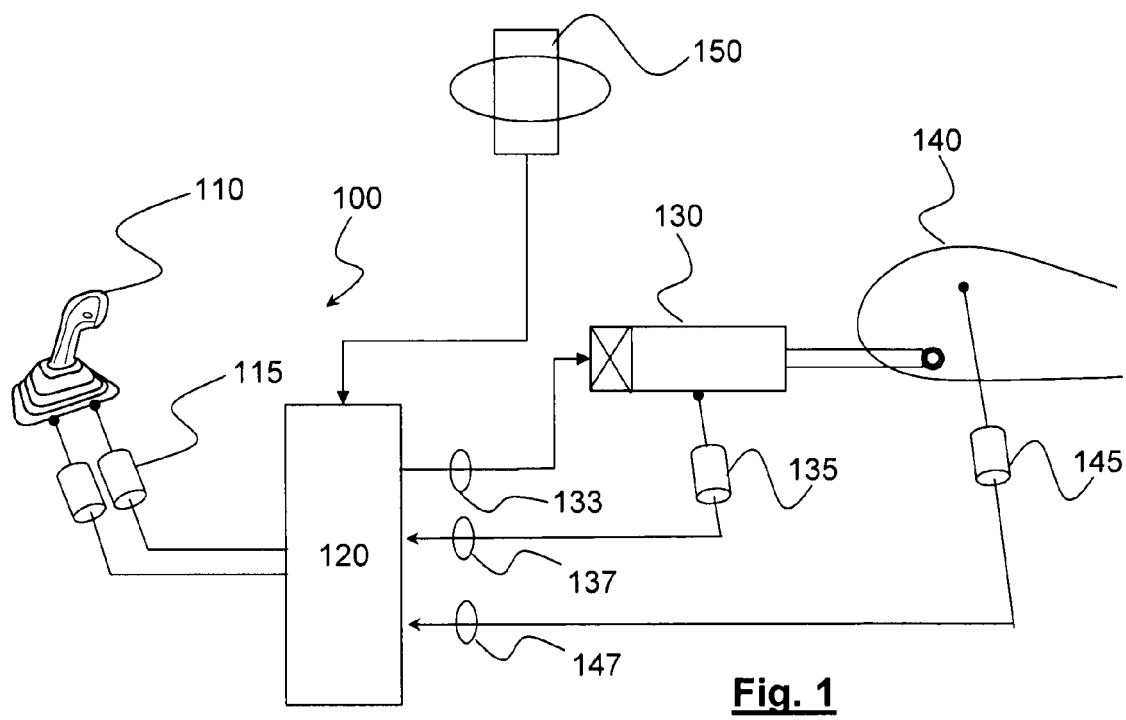
FIG. 1 diagrammatically illustrates a flight control system known from the state of the art.
Figure 2:
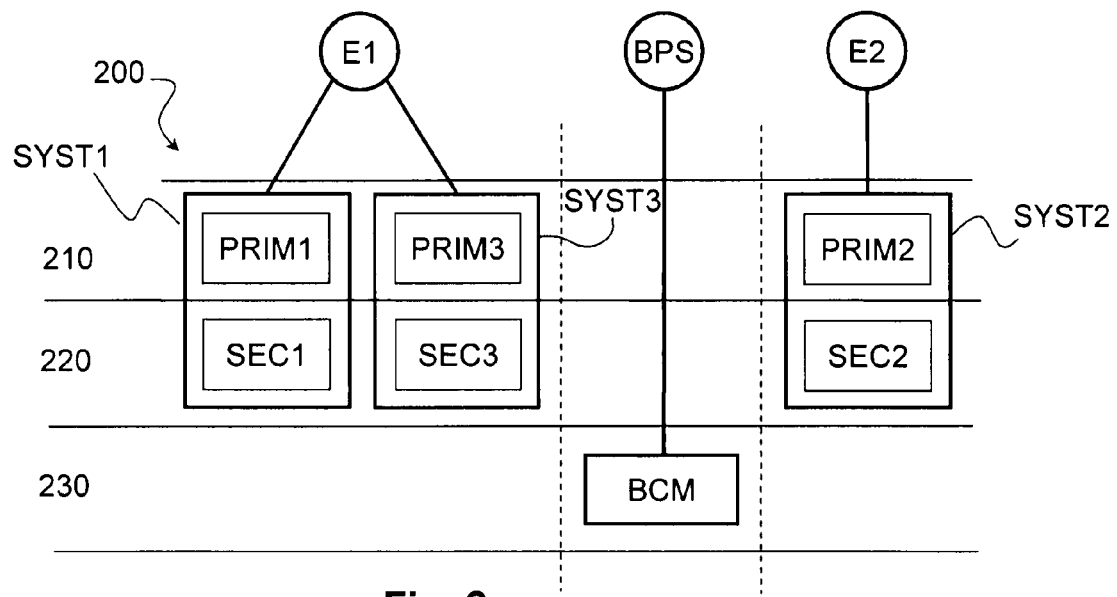
FIG. 2 diagrammatically illustrates a flight control system known from the state of the art.
Figure 3A:
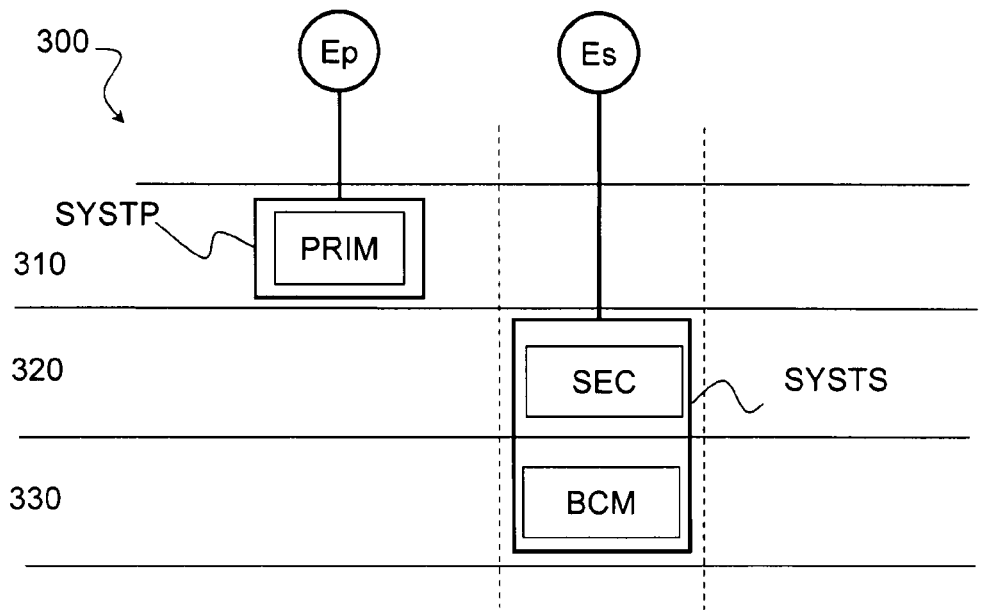
FIG. 3A shows a flight control system according to a first embodiment of the invention.

FIG. 3A diagrammatically illustrates a flight control system according to a first embodiment of the invention.

The flight control system 300 comprises two independent control systems respectively designated by SYSTP and SYSTS. The primary control system, SYSTP, comprises at least one primary computer denoted PRIM, a first set (not shown) of control surface actuators controlled by said computer and a first set (not shown) of sensors monitoring the status of said actuators and associated control surfaces. The primary computer is connected to the first set of actuators and to the first set of sensors by a network, called primary network.

Similarly, the secondary system SYSTS comprises at least one secondary computer, denoted SEC, a second set of control surface actuators commanded by said computer, and a second set of sensors monitoring the status of said actuators and associated control surfaces. Optionally, the secondary system also comprises a back-up computer BCM, sharing the second set of actuators and the second set of sensors with the secondary computer. The secondary computer and, if applicable, the back-up computer are connected to the second set of actuators and to the second set of sensors via a network, called secondary network, independent of the primary network and of a different type therefrom. Network independence means that a failure of the primary network does not cause a failure of the secondary network, in other words the flaws respectively affecting the primary and secondary networks are independent events. Networks of different types means networks operating according to different communication protocols. For example, the primary network may be an AFDX (Avionics Full DupleX switched Ethernet) network and the secondary network may be formed by one or several fieldbuses according to standard MIL-STD-1553.

It is important to note that the first and second sets of sensors are advantageously disjoint. Likewise, the first and second sets of actuators are disjoint.

The primary and secondary systems are respectively powered by independent energy sources Ep and Es of different types. Independent sources again means that the failure of one does not cause the failure of the other. Different types means that the energy generating principles are different. For example, Ep can be a generator coupled to a reactor and delivering a VFG (Variable Frequency Generator) variable frequency voltage depending on the speed of revolutions of the reactors, Es can be a Permanent Magnet Generator (PMG), mechanically driven by a motor. Generally, the energy source Es is chosen to be weaker than the energy source Ep.

Figure 3B:
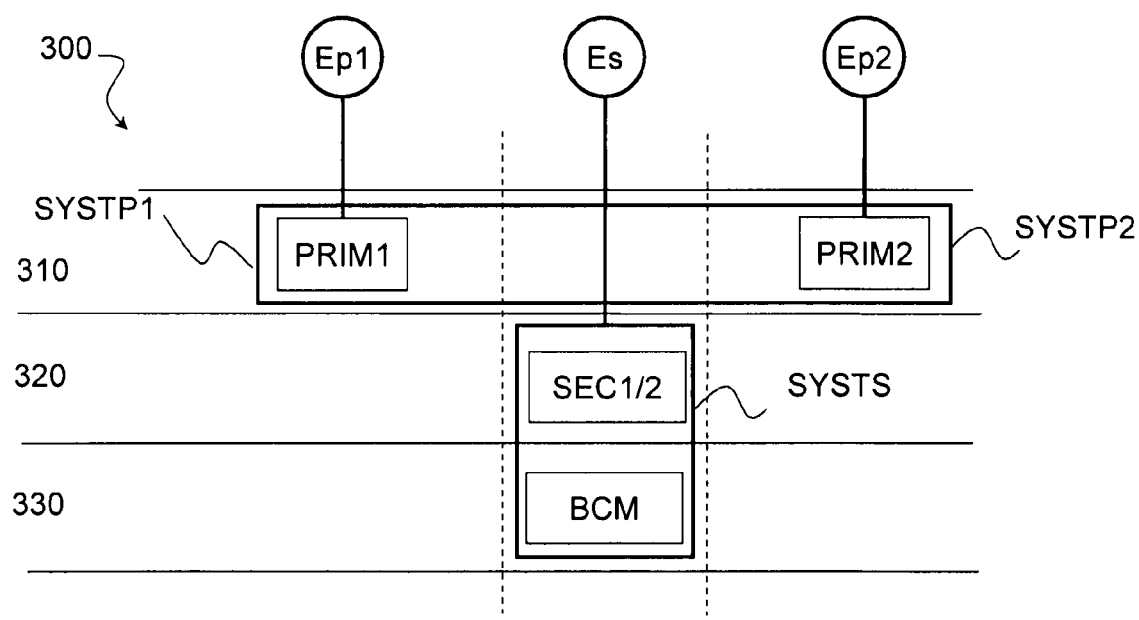
FIG. 3B shows a flight control system according to a second embodiment of the invention.

FIG. 3B diagrammatically shows a flight control system according to a second embodiment of the invention.

Unlike the first embodiment, the primary control system here comprises a plurality of primary computers connected to independent energy sources of different types. The primary computers are generic and have identical structures. This embodiment is preferred when the failure rate of a primary computer is above the level required by the certification body. It will be understood that if the maximum acceptable failure rate level is $\lambda$ and the average failure rate of a primary computer, considered alone, is $\lambda_0$, the number n of primary computers will be chosen such that $\lambda_0^n < \lambda$.

For illustration purposes, a configuration with two primary computers PRIM1 and PRIM2 has been shown here, but of course the invention applies in general to any number of such computers.

The computer PRIM1 is, as will be seen in detail later, connected to a first subset of the first set of actuators and a first subset of the first set of sensors using a first network. Likewise, the computer PRIM2 is connected to a second subset of the first set of actuators and a second subset of the first set of sensors via a second network. The primary network is then formed by the first and second networks.

The computers PRIM1 and PRIM2 each comprise a command module, called COM module, and a monitoring module, called MON. The MON and COM modules have identical structures and only differ in how they are programmed. A COM module can be reconfigured as a MON module and vice versa. The MON and COM modules are generic computers, in practice IMA cards mounted in a rack of the avionics bay, housing the specific application software.

The COM module sends the actuators command messages via the primary network (the actuators are equipped with terminals subscribing to the network) and receive information or configuration messages.

The MON module also receives the information or confirmation messages from the actuators and verifies the coherence between the command messages sent by the COM module and the information or confirmation messages that are returned to the latter by the different actuators.

The primary computers are respectively powered by independent electrical energy sources Ep1 and Ep2.

It is possible to attach, to the primary computer PRIM1, an additional computer PRIM3, with the same structure as PRIM1 and powered by Ep1, and able to take over for PRIM1 in case of failure of the latter. For the same reasons, it is possible to attach an additional computer PRIM4 to the primary computer PRIM2. The computers PRIM3 and PRIM4, like the computers PRIM1 and PRIM2, are each made up of generic computers, one used for commands and the other for monitoring.

As already mentioned relative to FIGS. 3A and 3B, the flight control system 300 also comprises a secondary system SYSTS. System SYSTS comprises one or more secondary computers, for example two computers SEC1, SEC2 and, advantageously, a back-up computer BCM. The secondary computers SEC1, SEC2 and the back-up computer BCM share the second sets of actuators and sensors owing to the secondary network.

Each of the secondary computers SEC1 and SEC2 is made up of MON and COM modules that play the same roles as those indicated previously for the primary system. The modules are, however, implemented here in the form of specific computers.

The secondary computers correspond to a more robust command mode 320 than the nominal mode 310 of the primary computers, in that, for example, the command laws of the control surfaces are simplified and/or the constraints on the observation of the instructions are relaxed relative to those used by the primary computers. Moreover, the secondary computers may not accept certain functionalities, such as auto-pilot.

The back-up computer BCM, when it is present, is a single-path computer, i.e. it is formed by a single module with a structure identical to a COM or MON module of a secondary computer. The back-up computer BCM takes over when the primary and secondary computer(s) are deactivated, whether automatically following a breakdown or manually by the pilots. The back-up computer has the particularity of not being able to be deactivated by an outside intervention or following an auto-test operation.

The secondary system SYSTS is powered by an independent electrical energy source Es of a different type from Ep1 and Ep2.

Figure 4:
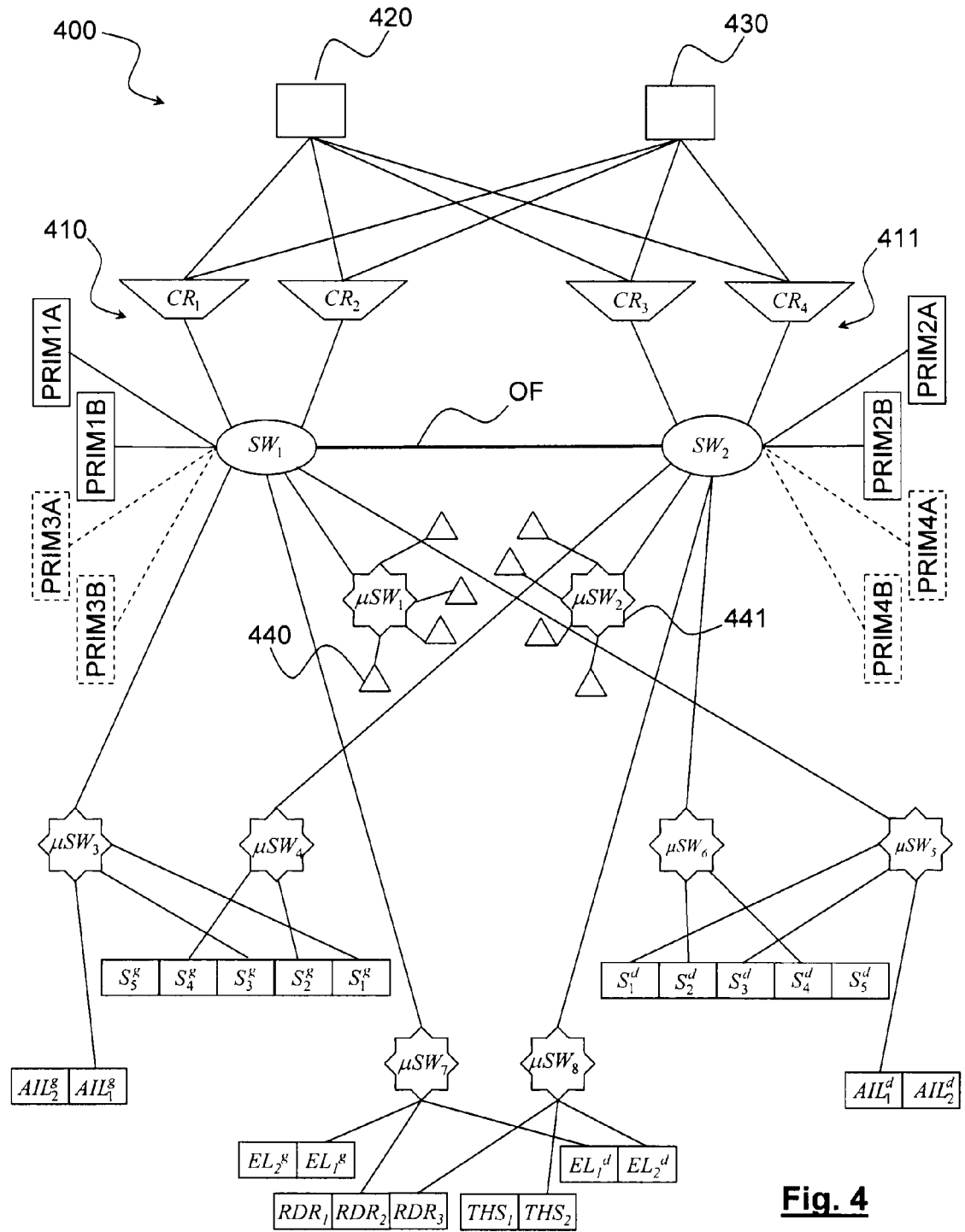
FIG. 4 shows an example of a primary control system according to the invention.

FIG. 4 more precisely illustrates the structure of the primary system SYSTP in the embodiment of FIG. 3B.

The primary computers PRIM1 and PRIM2 have been shown by their COM and MON modules, i.e. PRIM1A and PRIM1B for computer PRIM1, and PRIM2A and PRIM2B for computer PRIM2. As stated above, these modules are generic computers, mounted in a rack in the avionics bay. As previously indicated, it is possible to attach, to the computer PRIM1, a computer PRIM3 also comprising a COM module, PRIM3A and a MON module, PRIM3B (shown in broken lines). These modules are then connected to the frame switch $SW_1$. Likewise, it is possible to attach, to computer PRIM2, an additional computer PRIM4, including COM and MON modules respectively denoted PRIM4A and PRIM4B (shown in broken lines). These modules are connected to the switch $SW_2$.

The additional computers PRIM3 and PRIM4 can be back-up computers, not necessarily intended to perform flight control computations. They can, if needed, also be used by other onboard systems.

We will first describe the part of the primary system controlled by the first primary computer PRIM1.

The modules PRIM1A and PRIM1B are connected to the first network 410, advantageously an AFDX network. More precisely, they are connected to a first frame switch $SW_1$ also situated in the avionics bay. The switch $SW_1$ also receives, on two distinct ports, via the concentrators $CR_1$ and $CR_2$, the information supplied by the piloting members 420, 430 of the pilot and copilot. More precisely, the concentrators $CR_1$ and $CR_2$ multiplex the same information coming from 420 and 430 for cross-monitoring purposes. The concentrators $CR_1$, $CR_2$ have a generic architecture (IMA).

A certain number of sensors 440 are also connected to a first network 410, for example accelerometers and rate gyros used for the advanced flight functions of the flight controls. More precisely, distinct terminals subscribing to that network acquire signals provided by said sensors and send the corresponding data to the computers. If necessary, the sensors can incorporate said distant terminals and are therefore then directly subscribed to the AFDX network.

The PRIM1A and PRIM1B modules receive the information provided by the piloting members 420, 430 as well as by the sensors 440, while deducing flight commands therefrom, in particular the deflection orders for the control surfaces.

In nominal operation, the module PRIM1A transmits the flight commands to the various actuators connected to the first sub-network (the module PRIM1B only having a monitoring role). More precisely, terminals subscribed to the first network, located near the actuators, receive the commands from PRIM1A and transmit the electric orders to the actuators.

The subscribed terminals associated with the sensors or the actuators can be directly connected to a frame switcher such as the switch $SW_1$, situated in the avionics bay. However, in order to reduce the number and length of the links, it is possible to provide frame switching equipment called micro-switches. The micro-switches make it possible to locally process the frames coming from or intended for a cluster of subscribing terminals. More precisely, a micro-switch has a first port generally connected to an AFDX switch and a plurality of second ports connected to the different subscribers.

On the downlink, i.e. for frames received by the first port intended for a subscriber, the micro-switch acts as a hub, i.e. an incident frame on the first port is replicated on all of the second ports. The subscribers who receive it determine whether they are recipients, and ignore it if not and take it into consideration if yes. On the uplink, i.e. for frames emitted by the different subscribers, the micro-switch examines the second ports one by one and empties their respective buffers on the first port, according to a "round robin" type mechanism, ensuring equitable sharing of the bandwidth.

The terminals equipping the actuators generally comprise a control module of the actuator COM and a monitoring module MON responsible for verifying whether the electric orders transmitted to the actuator by the COM module are indeed consistent with the commands transmitted by the modules of the primary computers. The two COM and MON modules of a same terminal can be multiplexed to be connected to the same port of a micro-switch or can be connected to separate ports of a same micro-switch or to ports of separate micro-switches, the first option however making it possible to reduce the cabling of the network.

Generally, a subscribing terminal will be connected to a local micro-switch, unless latency time constraints require a direct connection to a switch. The architecture of the AFDX network will advantageously be chosen so that one does not pass through more than one switch and one micro-switch in passing through a module of a primary computer of a subscribing terminal.

As illustrated in FIG. 4, the first AFDX network 410 comprises micro-switches $\mu SW_1$, $\mu SW_3$, $\mu SW_5$, $\mu SW_7$ respectively corresponding to the first subset of sensors 440, and to the subsets of actuators respectively controlling the groups of control surfaces $G_1^l$, $G_2^l$ and $G_1^l$. The group $G_1^l$ here is made from the first left aileron $AUK_1^g$ and the left airbrakes $S_1^g$, $S_3^g$ the group $G_2^1$ is formed by the right aileron $AIL_1^d$ and right airbrakes $S_1^d$, $S_3^d$, the group $G_3^l$ is formed by the left and right elevators $EL_1^g$, $EL_1^d$ and the stabilizer $RDR_2$.

The micro-switches $\mu SW_1$, $\mu SW_3$ and $\mu SW_5$ are advantageously located in the central hold area of the aircraft, the micro-switch $\mu SW_7$ is located in the tail of the apparatus. Thus the micro-switches are located near the equipment they serve and the quantity of cabling is reduced.

The part of the primary system controlled by PRIM2 is similar to that controlled by PRIM1 and its description will therefore not be repeated in detail.

We will briefly note that the PRIM2A and PRIM2B modules are connected to a second network, here an AFDX network 411. More precisely, they are connected to a second frame switch $SW_2$ located like $SW_1$ in the avionics bay. The switch $SW_2$ receives on two distinct ports, via the concentrators $CR_3$ and $CR_4$, the information supplied by the piloting members 420, 430 of the pilot and copilot. The concentrators $CR_3$ and $CR_4$ multiplex the same information coming from 420 and 430 for cross-monitoring purposes. Like the concentrators $CR_1$ and $CR_2$, the concentrators $CR_3$, $CR_4$ have a generic architecture (IMA). A certain number of sensors 441 are connected to the second AFDX network 411. More precisely, remote terminals subscribing to said second network acquire signals provided by said sensors and transmit the corresponding data to the computers. The modules PRIM2A and PRIM2B receive the information provided by the piloting members 420, 430 as well as by the sensors 441 and compute flight commands, in this case the deflection orders for the control surfaces. In nominal operation, module PRIM2A transmits the flight commands to the various actuators connected to the second AFDX sub-network (module PRIM2B only playing a monitoring role). These actuators act on control surfaces belonging to the three groups $G_1^2$, $G_2^2$ and $G_3^2$.

The second AFDX network 411 comprises micro-switches $\mu SW_2$, $\mu SW_4$, $\mu SW_6$, $\mu SW_8$ respectively corresponding to the second subset of sensors 441, and to the groups of control surfaces $G_1^2$, $G_2^2$ and $G_3^2$. The first group $G_1^2$ here is formed by the left airbrakes $S_2^g$, $S_4^g$, the second group $G_2^2$ is formed by the right airbrakes $S_2^d$, $S_4^d$, the third group $G_3^2$ is formed by the rudder $RDR_3$, the trimmable horizontal surface $THS_2$ as well as the right elevator $EL_2^d$. The micro-switches $\mu SW_2$, $\mu SW_4$, $\mu SW_6$, are advantageously located in the central hold area of the aircraft, the micro-switch $\mu SW_8$ is located in the tail of the apparatus.

It is important to note that the first and second AFDX networks can be connected to each other to form a single network, for example using a connection between the switches $SW_1$ and $SW_2$. This connection is advantageously produced using an optical fiber OF, which allows galvanic decoupling of the two sub-networks. This connection allows each of modules PRIM1A, PRIM1B, PRIM2A and PRIM2B to exploit, in nominal mode, all of the information from the concentrators $CR_1$, $CR_2$, $CR_3$ and $CR_4$, as well as the sensors 440 and 441. This makes it possible to perform cross-monitoring between the different modules and, if applicable, to increase the availability of either of them. Furthermore, if one of the primary computers fails or is deactivated by the pilot, the other computer can take over for all of the control surfaces by recovering the information coming from all of the sensors. Moreover, if two actuators respectively connected to the first and second networks control the same control surface, they can dialogue via the coupling connection between the two networks so that their actions are coherent and do not create mechanical stresses in the control surface in question. Owing to this coupling connection, the dialogue between the two actuators can be established without going through the central computers and therefore with a small latency time.

The connections belonging to the first and second AFDX networks can be done traditionally using pairs of twisted wires, using optical fibers or a combination of the two, the optical fiber being used for the connections most sensitive to any electromagnetic disturbances.

Lastly, in general the nodes of the first and/or second AFDX network(s) can be frame switches (SW) or micro-switches ($\mu SW$) as defined above, or a combination of the two as shown in FIG. 4, the choice being made in particular as a function of the traffic and latency constraints on the network.

Figure 5:
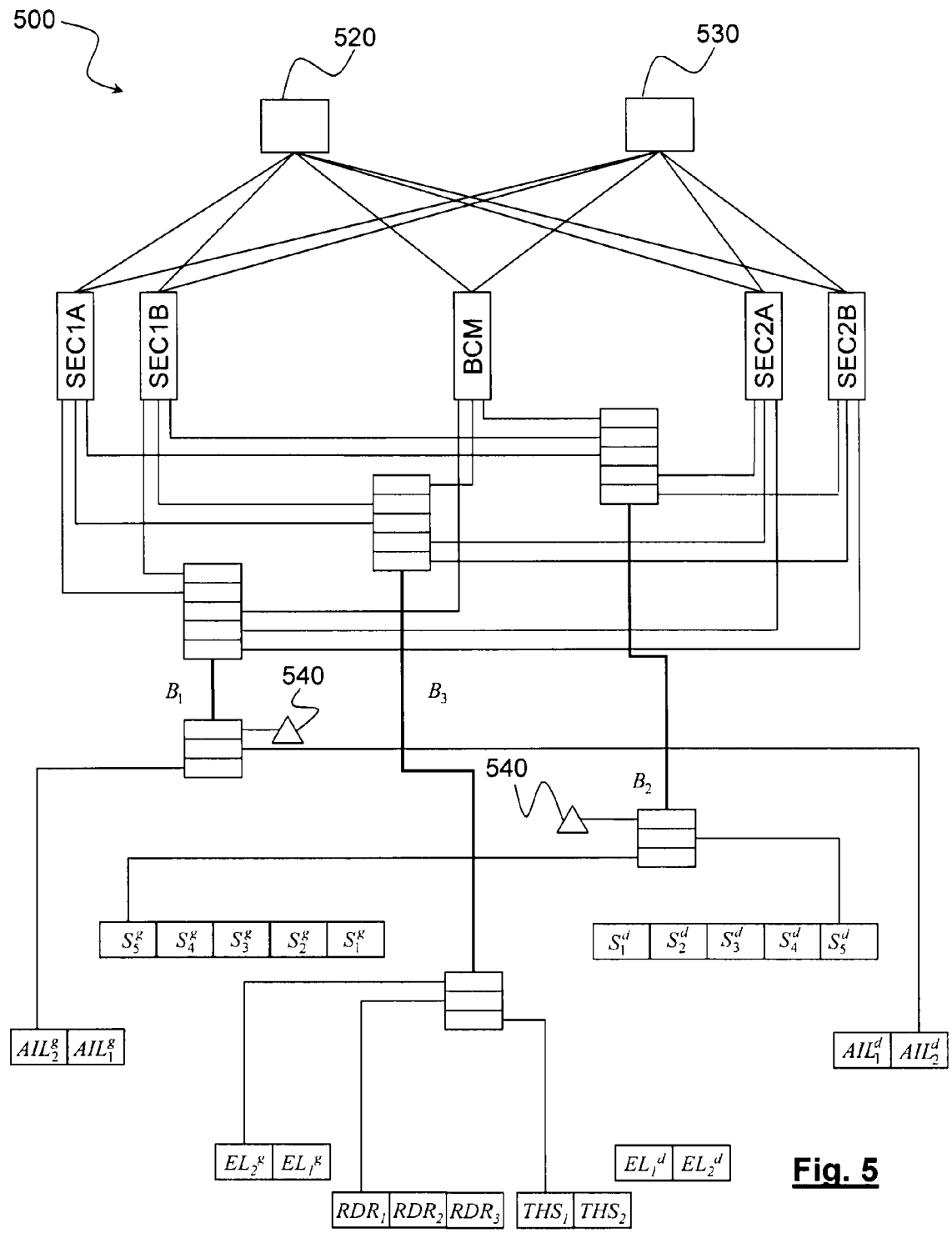
FIG. 5 shows an example of a secondary control system according to the invention.

FIG. 5 illustrates one example embodiment of the secondary control system SYSTS.

The secondary control system here comprises two secondary computers SEC1, SEC2 and a backup computer denoted BCM. The secondary computer SEC1 comprises a COM module and a MON module, respectively denoted SEC1A and SEC1B. Likewise, the secondary computer SEC2 comprises a COM module and a MON module, respectively denoted SEC2A and SEC2B. The backup computer BCM is formed by a single module, with a structure identical to that of the preceding COM and MON modules. The computers SEC1, SEC2 and BCM share a plurality of buses each corresponding to the control of a subset of control surface actuators. In the present case, three buses $B_1$, $B_2$ and $B_3$ are provided, respectively corresponding to aileron control surfaces, airbrake control surfaces and rear control aerodynamic flight-control surfaces. The buses are preferably in compliance with standard MIL-STD-1553. Other types of organization of the secondary network can be considered, in particular the secondary network can be reduced to a single bus.

In nominal operation, the computer SEC1 is master of the buses $B_1$, $B_2$ and $B_3$. In case of failure of SEC1, the computer SEC2 takes over the computations and becomes master of the buses. If the primary systems PRIM1, PRIM2 and the computers SEC1 and SEC2 fail, the computer BCM in turn takes over control of the buses and, as a last resort, controls the control surfaces of the aircraft.

Sensors 540 can also be connected to the different buses, for example movement sensors such as rate gyros. These sensors are distinct from those belonging to the primary systems. They are advantageously equipped with digital interfaces directly allowing coupling to the buses $B_1$, $B_2$ and $B_3$.

The computers SEC1, SEC2 and BCM receive information from the piloting members, i.e. information relative in particular to the mini-sticks and the control columns of the pilot and copilot's stations. This information is sent to the computers in digital or analog form. More precisely, this information is acquired directly by the input/output cards of the COM and MON modules of the computers SEC1 and SEC2 as well as by the input/output card of the BCM module.

From information from the piloting members and, if applicable, information provided by the sensors connected to the buses, the computers SEC1 and SEC2 compute the commands to actuate the control surfaces. For example, the bus $B_1$ makes it possible to control the left aileron $AIL_2^g$ and the right $AIL_2^d$, the bus $B_2$ makes it possible to control the left airbrake $S_5^g$ and the right airbrake 4, the bus $B_3$ makes it possible to control the left elevator $EL_2^g$, the stabilizer $RDR_1$ and the trimmable horizontal surface $THS_1$.

The actuators controlling these control surfaces are so-called smart actuators because they are capable of local control. Each actuator is equipped with a terminal subscribed to the MIL-STD-1553 network with a COM module controlling the actuator and a MON module monitoring the COM module. The MON module can deactivate the COM module in case of disagreement between the command and the monitoring.

The flight control system described above has a certain number of redundant computers for availability purposes. For example, the primary computer (optional) PRIM3 is redundant with PRIM1, the primary computer (optional) PRIM4 is redundant with PRIM2. Similarly, the secondary computer SEC2 is redundant with SEC1. When the main computer (PRIM1, PRIM2, SEC1) fails, the auxiliary computer (PRIM3, PRIM4, SEC2) takes over. As already seen, each primary or auxiliary computer comprises two COM and MON modules, which therefore requires four modules per primary system (SYSTP1, SYSTP2) or secondary system.

According to one alternative, in place of two pairs of COM and MON modules, one uses three independent modules each performing the same control computations in parallel. The results are then compared: in minimal operation, there is unanimity between the different modules; however, if those obtained by one of the modules differ from those obtained by the other two, only the results corresponding to the majority vote are used.

The advantage of this alternative is to reduce the number of modules relative to the control system previously described. One in fact has two primary systems SYSTP1 and SYSTP2 respectively comprising a primary computer PRIM1 with three modules PRIM1A, PRIM1B, PRIM1C and a primary computer PRIM2 also with three modules. The system SYSTS also has a secondary computer SEC with three modules SEC1A, SEC1B, SEC1C as well as a backup computer with a single module BCM.

According to a second alternative, in place of two pairs of modules COM and NOM, one uses a single pair of such modules with an additional reserve module that can be configured if needed as COM or MON module to replace a faulty module. This reserve module, with a generic architecture, is not necessarily intended to be used for flight control computations but, if needed, can be used by other onboard systems.

Figure 6A:
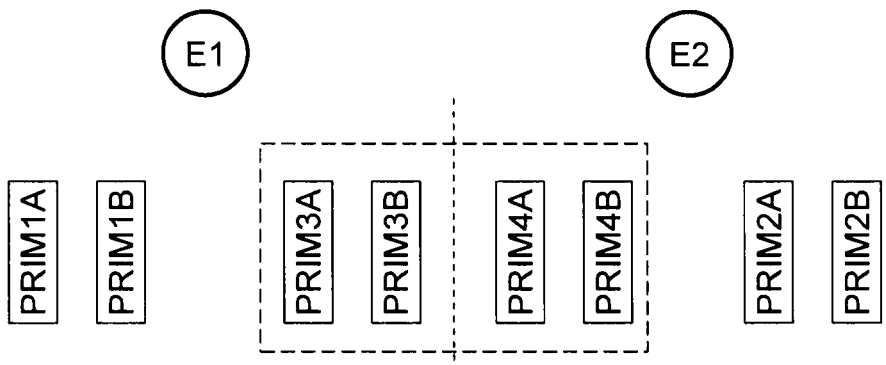
FIGS. 6A and 6B diagrammatically show two implementation embodiments of the computation modules of the primary control system of FIG. 4.
Figure 6B:
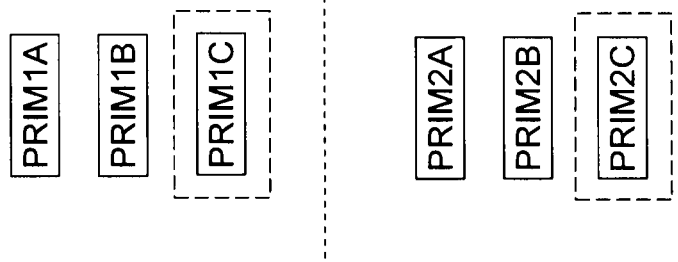

FIGS. 6A and 6B respectively show the architecture of the primary system SYSTP in the configuration of FIG. 4 and in that of the second alternative.

FIG. 6B shows that, in the second alternative, the redundancy (shown by the broken line) pertains to a single module per computer: PRIM1C for computer PRIM1 and PRIM2C for computer PRIM2. There is therefore a gain of two modules relative to FIG. 6A, where the redundancy concerns the complete computer.

If, upon detection of a failure, it is not possible to determine which COM or MON module of PRIM1 (or PRIM2) is faulty, the computer PRIM1 (PRIM2, respectively) is declared faulty. The other primary computer then controls the aircraft.

Figure 7A:
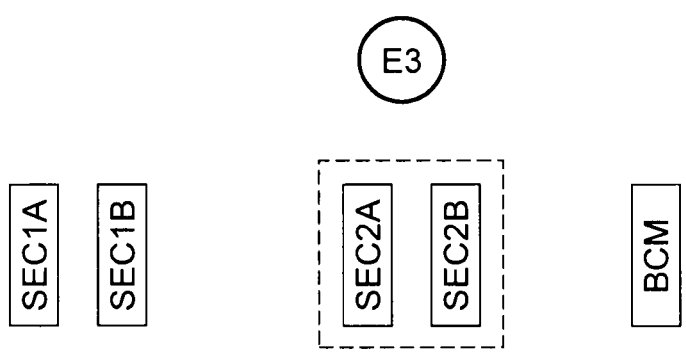
FIGS. 7A and 7B diagrammatically show two implementation alternatives of the computation modules of the secondary control system of FIG. 5.
Figure 7B:

FIGS. 7A and 7B respectively illustrate the architecture of the secondary control system in the configuration of FIG. 5 and in that of the second alternative embodiment.

FIG. 7B shows that the redundancy pertains to a single module SEC1C for computer SEC while the redundancy pertains to the complete secondary computer SEC2A, SEC2B in FIG. 7A, resulting in a gain of one module. If it is not possible to determine which MON or COM module of the computer SEC1 is faulty, the entire computer is considered faulty.

It should be noted that the primary system, on the one hand, and the secondary system, on the other hand, can use different alternatives.

The embodiment of the secondary system illustrated in FIG. 5 uses a backup module BCM. It is, however, possible to do without this module if one uses so-called "smart" actuators, i.e. actuators capable of receiving and executing orders directly from the piloting members. More precisely, upon the loss of the primary and secondary computer(s), the actuators acting on the elevators and the ailerons then directly receive the orders from the mini-stick and the actuator acting on the stabilizer receives orders from the rudder bar.

In the embodiments previously described, the information from the piloting members is sent to the concentrators $CR_1$, $CR_2$, $CR_3$, $CR_4$ for the primary system SYSTP, and directly to the modules of the computers SEC1, SEC2, BCM for the secondary system SYSTS.

According to a first option, the information from the piloting members is transmitted in analog form to the concentrators $CR_1$, $CR_2$, $CR_3$, $CR_4$ and to the modules of SEC1, SEC2. The concentrators perform the analog digital conversion and transmit the information thus digitized to the modules of the primary computers via the switchers $SW_1$ and $SW_2$.

A second option differs from the first in that the piloting information is sent to the modules of SEC1, SEC2 not directly, but via concentrators $SR_1$, $SR_2$, $SR_3$, $SR_4$ specific to the flight commands, which themselves perform the analog digital conversion. These concentrators have a specific material architecture opposite the concentrators $CR_1$, $CR_2$, $CR_3$, $CR_4$, which have a generic hardware. Furthermore, the specific concentrators can use a network of a different type from that used by the generic concentrators (e.g. AFDX for generic concentrators and MIL-STD-1553 for specific concentrators).

According to a third option, the piloting information is sent directly in digital form by the piloting members to the modules of the primary and secondary computers. The computers $CR_1$, $CR_2$, $CR_3$, $CR_4$ and $SR_1$, $SR_2$, $SR_3$, $SR_4$ are then superfluous.

According to a fourth option, the piloting information is sent in analog form to the concentrators $CR_1$, $CR_2$, $CR_3$, $CR_4$ and directly in digital form to the modules of the computers SEC1, SEC2 and BCM. One skilled in the art will understand that other options can be contemplated without going beyond the scope of the invention.

The invention claimed is:

1. A flight control system for an aircraft to control a plurality of actuators adapted for actuating control surfaces of the aircraft based on information supplied by one or more of piloting members and sensors of the aircraft, comprising:
a primary control system to control a first set of control surface actuators of the aircraft, the primary control system including a first primary computer and a second primary computer, each said primary computer having the same structure, with generic computation modules, and being respectively powered by a first primary energy source and a second primary energy source; and
a secondary control system to control a second set of control surface actuators of the aircraft, different from the first set of control surface actuators, the secondary control system including at least one secondary computer and a back-up computer, each said secondary computer having specific computation modules with an architecture specific to flight control computations and being powered by a secondary energy source,
wherein the primary control system is independent from the secondary control system such that failure of the primary control system does not cause failure of the secondary control system and such that failure of the secondary control system does not cause failure of the primary control system,
wherein the primary and secondary energy sources are independent from each other and are of different type of energy generating principle,
wherein a first network is associated with the primary control system and a second network is associated with the secondary control system, the first network having a first protocol and the second network having a second protocol different from the first protocol, and the first network being independent from the second network,
wherein the first and second primary energy sources are independent from each other,
wherein each said secondary computer and the back-up computer of the secondary control system are powered by the secondary energy source and share the second set of actuators,
wherein the primary control system is configured to control the first set of control surface actuators and not the second set of control surface actuators, and
wherein the secondary control system is configured to control the second set of control surface actuators and not the first set of control surface actuators.

2. The flight control system according to claim 1, wherein each said primary computer is connected to the first network, which is a primary network, a first plurality of terminals subscribing to the primary network being adapted to acquire signals provided by a first set of sensors, a second plurality of terminals subscribing to the primary network being able to receive commands from the primary computer and to transmit electric orders to actuators belonging to the first set of actuators.

3. The flight control system according to claim 2, wherein a node of the primary network associated with the first primary computer and a node of the primary network associated with the second primary computer are connected by a link.

4. The flight control system according to claim 2, wherein at least one cluster of terminals subscribed to the primary network is connected to a micro-switch, the micro-switch being configured to receive, on a first port, frames sent by the primary computer intended for at least one terminal of the cluster and to receive, on a plurality of second ports, frames respectively sent by the different terminals of the cluster, the micro-switch having a repeater function for downlink operation and a multiplexer function for uplink operation.

5. The flight control system according to claim 2, wherein each said primary computer is connected to a concentrator via its associated primary network, the concentrator being configured to receive information provided by a plurality of the piloting members, to multiplex the information, and to send the information thus multiplexed to the primary computer.

6. The flight control system according to claim 1, wherein each said primary computer includes at least one pair of the generic computation modules, the at least one pair of generic computation modules including a control module and a monitoring module.

7. The flight control system according to claim 6, wherein each said primary computer includes first and second pairs of the generic computation modules, the second pair taking over control computations if the first pair fails.

8. The flight control system according to claim 6, wherein each said primary computer includes a triplet of independent generic computation modules, each said specific module performing same control computations in parallel from information provided by at least one of the piloting members and the sensors, control values obtained by the triplet of independent generic computation modules being compared to select values given by a majority.

9. The flight control system according to claim 1, wherein each said primary computer includes a pair of the generic computation modules, including a control module, a monitoring module, and a reserve module configured as an additional control module or an additional monitoring module in a case of failure of one or the other of the modules of the pair of generic computation modules.

10. The flight control system according to claim 1, wherein said at least one secondary computer includes a pair of the specific computation modules, the pair of specific computation modules including a control module and a monitoring module.

11. The flight control system according to claim 10, wherein the secondary control system further includes a specific reserve module configured as a reserve control module or a reserve monitoring module in event of a failure of any of the modules of the pair of specific computation modules.

12. The flight control system according to claim 10, wherein each said secondary computer includes a triplet of independent specific computation modules, each said specific computation module performing same control computations in parallel from information provided by piloting members, control values obtained by the triplet of independent specific computation modules being compared to select values given by a majority.

13. The flight control system according to claim 10, wherein the second network associated with the secondary control system is a secondary network, each said secondary computer being connected to the secondary network, a first plurality of terminals connected to the secondary network being configured to acquire signals provided by a second set of sensors and a second plurality of terminals subscribed to the secondary network and configured to receive commands from the secondary computer and to transmit electric orders to actuators belonging to the second set of control surface actuators, the first and second sets of sensors being disjointed, and the first and second sets of control surface actuators being disjointed.

14. The flight control system according to claim 13, wherein the back-up computer includes an independent specific control module, as a back-up specific control module, that cannot be deactivated upon outside intervention and cannot deactivate itself, each said pair of specific computation modules and the back-up specific control module sharing the second network.

15. The flight control system according to claim 1, wherein the aircraft is a fixed-wing aircraft, and the flight control system is configured to be implemented in the fixed-wing aircraft.

16. The flight control system according to claim 1, wherein the first protocol is an Avionics Full Duplex Switched Ethernet (AFDX) network protocol, and the second protocol is a protocol for at least one fieldbus according to standard MIL-STD-1553.

17. The flight control system according to claim 1, wherein one of the first primary energy source and the second primary energy source includes a generator coupled to a reactor to deliver a variable frequency voltage, and the secondary energy source includes a permanent magnet generator mechanically driven by a motor.

18. The flight control system according to claim 1, wherein the secondary energy source has a maximum output capacity less than that of both the first primary energy source and the second primary energy source.

19. The flight control system according to claim 1,
wherein the primary control system includes the first set of control surface actuators and a first set of sensors associated with the first set of control surface actuators,
wherein the secondary control system includes the second set of control surface actuators and a second set of sensors associated with the second set of control surface actuators,
wherein the first set of actuators is disjoint with respect to the second set of actuators, and
wherein the first set of sensors is disjoint with respect to the second set of sensors.

20. A flight control system for an aircraft to control a plurality of actuators adapted for actuating control surfaces of the aircraft based on information supplied by one or more piloting members and sensors of the aircraft, comprising:
a primary control system to control a first set of control surface actuators of the aircraft, the primary control system including a first primary computer and a second primary computer, each said primary computer having the same structure, with generic computation modules and being respectively powered by a first primary energy source and a second primary energy source; and
a secondary control system to control a second set of control surface actuators of the aircraft, different from the first set of control surface actuators, the secondary control system including at least one secondary computer and a back-up computer, each said secondary computer having specific computation modules with an architecture specific to flight control computations and being powered by a secondary energy source,
wherein the primary control system is independent from the secondary control system such that failure of the primary control system does not cause failure of the secondary control system and such that failure of the secondary control system does not cause failure of the primary control system, wherein the primary and secondary energy sources are independent from each other and are of different type of energy generating principle, wherein a first network is associated with the primary control system and a second network is associated with the secondary control system, the first network having a first protocol and the second network having a second protocol different from the first protocol, and the first network being independent from the second network, wherein the first and second primary energy sources are independent from each other, wherein each said secondary computer and the back-up computer are powered by the secondary energy source and share the second set of actuators, wherein the back-up computer shares a set of actuators and a corresponding set of sensors with said at least one secondary computer, wherein the primary control system is configured to control the first set of control surface actuators and not the second set of control surface actuators, and wherein the secondary control system is configured to control the second set of control surface actuators and not the first set of control surface actuators.

\* \* \* \* \*